United States Patent [19]

Le Deit et al.

[11] Patent Number: 5,593,006
[45] Date of Patent: Jan. 14, 1997

[54] SLIDING CALIPER DISK-BRAKE

[75] Inventors: Gerard Le Deit, Courtry; Jean Louis Gerard, Bagnolet, both of France

[73] Assignee: AlliedSignal Europe Services Techniques, Drancy, France

[21] Appl. No.: 244,167

[22] PCT Filed: May 6, 1994

[86] PCT No.: PCT/FR94/00535

§ 371 Date: May 20, 1994

§ 102(e) Date: May 20, 1994

[87] PCT Pub. No.: WO94/28329

PCT Pub. Date: Dec. 8, 1994

[30] Foreign Application Priority Data

May 25, 1993 [FR] France .................... 93 06182

[51] Int. Cl.⁶ .................................. F16D 55/227
[52] U.S. Cl. ...................... 188/73.45; 188/73.37; 188/73.44
[58] Field of Search ............. 188/73.34, 73.42, 188/73.43, 73.44, 73.45

[56] References Cited

U.S. PATENT DOCUMENTS

| | | | |
|---|---|---|---|
| 4,042,074 | 8/1977 | Ishihara | 188/73.3 |
| 4,427,096 | 1/1984 | Stoka et al. | 188/73.45 |
| 4,448,288 | 5/1984 | Delaunay | 188/73.45 |
| 4,448,289 | 5/1984 | Gumkowski et al. | 188/73.45 |
| 4,552,253 | 11/1985 | Burgdorf et al. | 188/73.45 |
| 4,641,730 | 2/1987 | Lombardi et al. | 188/73.45 |
| 4,685,542 | 8/1987 | Colpaert | 188/73.45 |
| 4,741,419 | 5/1988 | Rath | 188/73.45 |
| 4,762,206 | 8/1988 | Arimitsu | 188/73.45 |
| 5,012,902 | 5/1991 | Moody et al. | 188/73.45 |
| 5,226,510 | 7/1993 | Le Deit | 188/73.45 |

FOREIGN PATENT DOCUMENTS

| | | | |
|---|---|---|---|
| 0468696 | 1/1992 | European Pat. Off. | 188/73.45 |
| 5272562 | 10/1993 | Japan | 188/73.45 |

*Primary Examiner*—Robert J. Oberleitner
*Assistant Examiner*—Chris Schwartz
*Attorney, Agent, or Firm*—Leo H. McCormick, Jr.

[57] ABSTRACT

A disk brake having a caliper which slides on a stationary support formed by at least one axial guide pin for moving at least one friction pad against a rotating disk. A locking device which engages the stationary support to prevent the caliper from rotating about the axial guide pin. The locking device includes an axial spindle having a shank, a part of which slides in a bore formed in the stationary support, and a foot which forms a planar stop surface perpendicular to a central axis of the axial spindle. The foot engages a corresponding planar surface on the caliper. During assembly of the disk brake, the foot of the axial spindle interacts with a blocking member after passing through a mounting opening in the caliper to prevent rotation and axially center the spindle with respect to the stationary member.

10 Claims, 5 Drawing Sheets

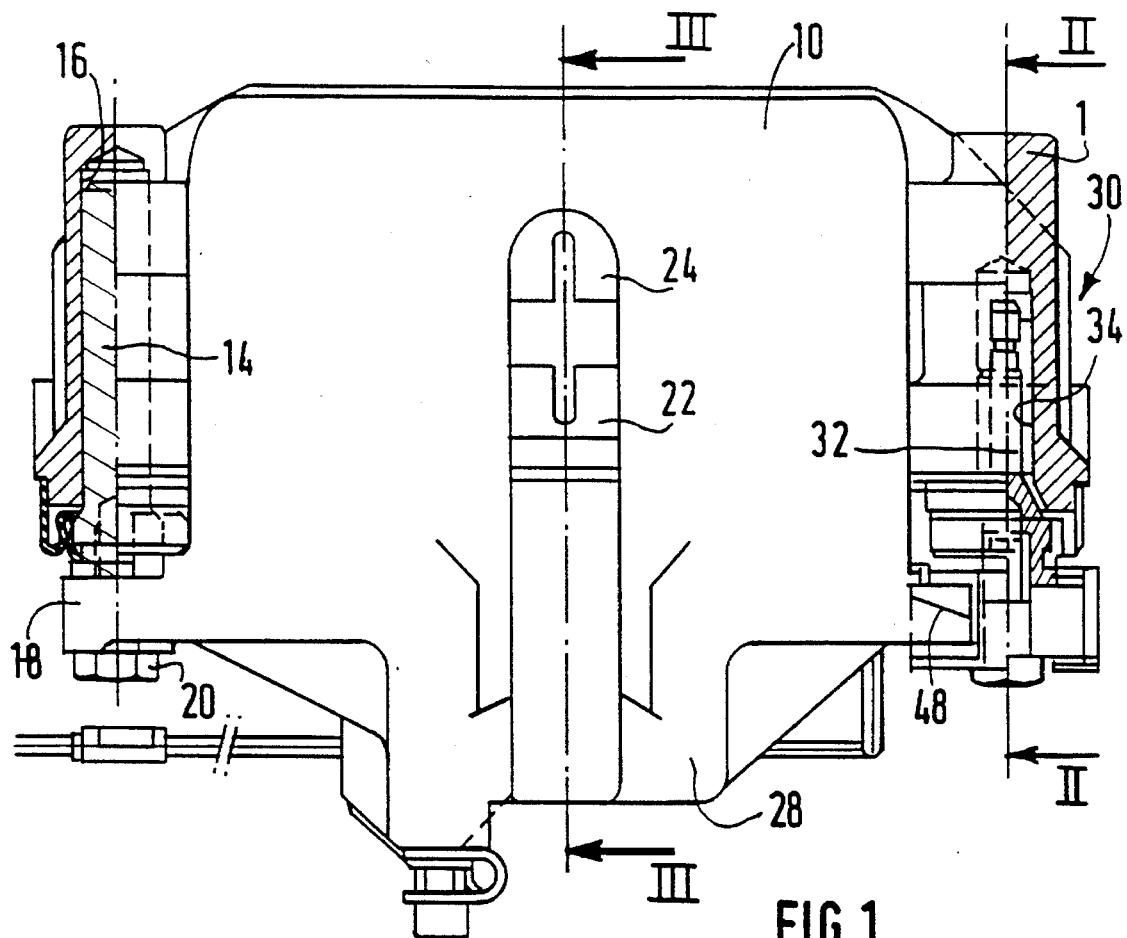
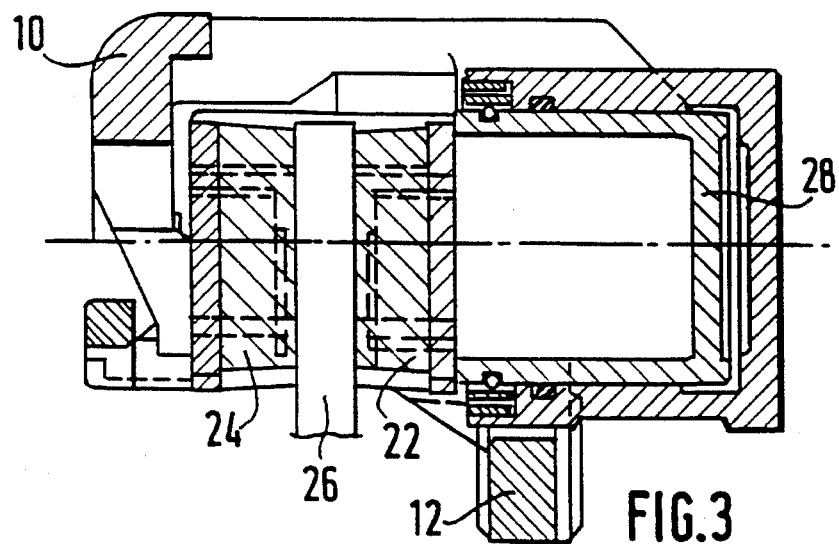

SLIDING CALIPER DISK-BRAKE

The subject of the present invention is a sliding caliper disk-brake which can equip motor vehicles in particular.

Disk-brakes of this type comprise a stationary support secured to a stationary part of the vehicle, and a caliper sliding on this stationary support and including a brake motor for applying a first friction pad onto one of the faces of a rotating disk secured to a wheel of the vehicle, the caliper applying, by reaction, a second friction pad onto the other face of the disk. The caliper slides with the aid of two axial guide pins, or of one axial guide pin and of an axial spindle, these being fixed onto the caliper or the stationary support and interacting with bores formed in the stationary support or the caliper, respectively.

Current machining machines are capable of producing, in one same component, bores, possibly tapped, which are practically perfectly parallel. However, it is still necessary to provide a manufacturing tolerance as regards the distance between the axes of these bores.

Document U.S. Pat. No. 4,061,209 discloses a disk-brake of the type recalled above, in which, to take account of this manufacturing tolerance, at least one of the bores is oversized, and the guide pin interacting with this bore is stressed into an off-centered position in sliding contact with the wall of this bore by a spring which normally stresses the friction pads in the stationary support.

Such an arrangement therefore imposes a significant clearance of the guide pin in the corresponding bore, so that an elastic sleeve has to be arranged around the guide pin to avoid noise and to damp out the vibrations generated when the disk-brake is actuated. In addition, the guidance of the caliper during this actuation is very imperfect.

Also, document GB-A-2,159,219 disloses a disk-brake of this type, in which the caliper slides on the stationary support by means of two axial guide pins each including a cylindrical sheath and a fixing screw. An assembly element in the form of a gutter with parallel sides straddles the stationary support and includes tapped parts interacting with the threaded parts of the guide pin screws.

The ends of the assembly element form forks interacting with notches formed on the sleeves in order to prevent the sleeves from rotating when the guide pin screws are screwed. The assembly element makes it possible to avoid the eccentric effect during tightening of the guide pin screws, but at the same time it determines the distance between the axes of fixing of the guide pins and does not make it possible to take account of the manufacturing tolerances regarding this distance, and consequently it goes against the axial centering of the guide pin when it is fixed.

Also, document EP-A-0,395,460 discloses a disk-brake of the same type, in which the caliper slides on the stationary support by means of an axial guide pin, and is held in terms of rotation with respect to the support by a locking means of the ball joint type, made up of a spindle, in order to allow misalignment of the caliper with respect to the stationary support when the brake motor is actuated.

The locking spindle includes, at its end penetrating into the bore of the stationary support, a small bearing surface allowing the ball joint effect, and allowing preferential locking in one direction whilst authorizing certain freedom in a perpendicular direction.

The immobilization of the locking spindle in terms of rotation is obtained by a hex-head shape of the end of the spindle, housed in a groove produced in a part of the caliper. This layout has the drawback that the tightening of the screw generates a tangential load on the spindle, which can bring the end of the latter to move in the groove of the caliper and thus go against the desired self-centering effect.

As a consequence, the object of the present invention is to overcome the drawbacks recalled hereinabove by providing a caliper disk-brake comprising a locking spindle, in which the manufacturing or machining tolerances of the bores are taken into account, and of which the means of stopping the spindle from rotating make it possible to center the latter in its bore such that the sliding of the caliper is optimal when the disk-brake is operating.

To this end, the invention provides a disk-brake, including a caliper sliding on a stationary support by means of at least one axial guide pin, the caliper including actuating means capable of stressing at least one friction pad, received in anchoring and sliding in the stationary support, against a rotating disk, an axial spindle for locking the caliper in terms of rotation about the axial guide pin onto the stationary support, the axial locking spindle including a shank sliding in a bore, formed in the stationary support or the caliper, and a foot forming a planar stop surface perpendicular to the axis of the axial spindle and intended to come to rest on a planar part of the caliper or of the stationary support, the foot of the axial spindle interacting with a blocking member passing with clearance through a mounting opening made in the caliper or the stationary support in order to allow an axial centering of the spindle during assembly of the brake.

According to the invention, a holding member is arranged in the vicinity of the mounting opening to immobilize, in terms of rotation, the foot of the axial spindle while the brake is being assembled.

The invention will now be described by way of example with reference to the accompanying drawings in which:

FIG. 1 is a plan view, in partial section, of a disk-brake produced in accordance with a first embodiment of the present invention;

FIG. 3 is a sectional view along the line III—III of FIG. 1;

Figure 6:
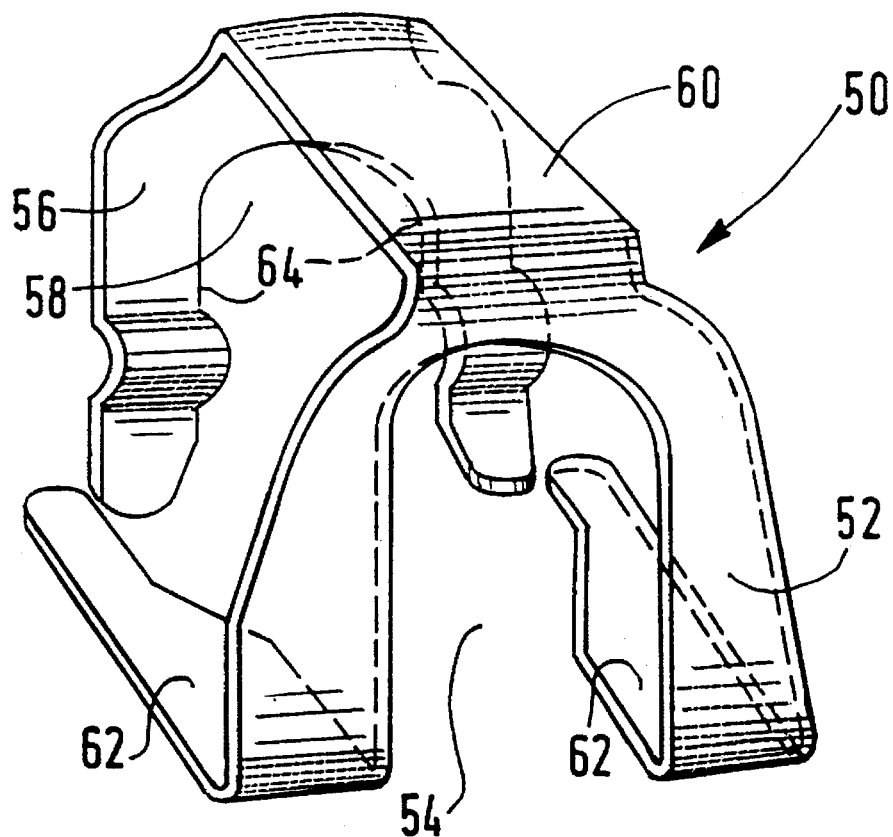
FIG. 6 is a perspective view, on a larger scale, of the holding member used in the first embodiment of the disk-brake of the invention.
Figure 2:
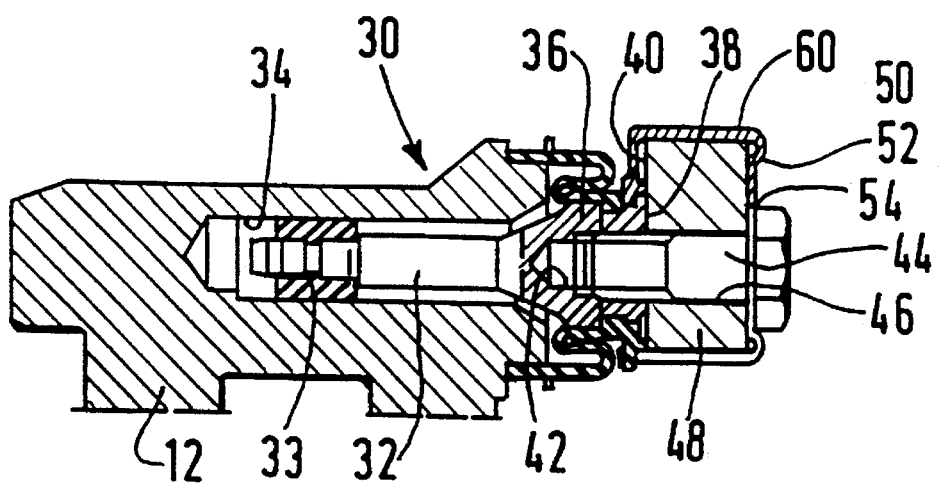
FIG. 2 is a sectional view along the line II—II of FIG. 1.

The figures depict a disk-brake, including a caliper 10 slidingly mounted on a stationary support 12, provided to be secured to a stationary part of the vehicle (not represented). In the embodiment taken as an example, the caliper 10 slides on the stationary support 12 by means of an axial guide pin 14, received in sliding with a reduced clearance in a bore 16 formed in the stationary support 12, the guide pin being moreover secured to an arm 18 of the caliper 10, for example in means [sic] of a screw 20.

The disk-brake also includes two friction pads 22 and 24 intended to come into frictional engagement with a rotating disk 26 during actuation of a brake motor 28 consisting, for example, of a piston subjected to the action of a pressurized hydraulic fluid.

A locking means, denoted overall by the reference 30, is provided to prevent any rotation of the caliper 10 about the guide pin 14. In the example represented in FIGS. 1 to 6, the locking means 30 includes an axial spindle, formed by a rod 32 received so that it can slide via a sliding part 33 in a bore 34 formed in the stationary support 12, and by a foot 36. The foot includes a planar surface 38, perpendicular to the axis of the spindle and forming, when the disk-brake is assembled, a stop resting on a planar part 40 of the caliper 10.

According to an important feature of the invention, a reduced clearance is provided for the sliding of the part 33 in the bore 34, this reduced clearance preferably being equal to the one which exists between the axial guide pin 14 and the bore 16. The sliding part 33 could be, as has been represented, attached to the rod 32, for example by force-fitting, or be produced integrally with the rod 32.

The foot 36 is formed with a tapped bore 42 opening out into the surface 38, and intended to receive a blocking member 44, such as a screw, passing with clearance through a mounting opening 46 made in an arm 48 of the caliper 10.

The brake is mounted in a conventional way: the caliper 10, equipped with a guide pin 14, is put in place on the stationary support 12 by introducing this guide pin into the bore 16. The caliper 10 is tilted (upwards considering FIGS. 4 and 5) so as to uncover the entrance of the bore 34; it is then possible to make the part 33 of the rod 32 of the axial spindle slide in the bore 34. The axial spindle is therefore in a centered position in the bore 34, given the reduced clearance existing between the latter and the sliding part 33 of the rod 32. The caliper is then tilted in the other direction to align the opening 46 with the bore 42 of the foot 36 of the spindle. The screw 44 may then be introduced into the opening 46 to secure the axial spindle to the caliper, and thus lock the latter in terms of rotation about the guide pin 14.

The clearance between the opening 46 and the rod 44 makes it possible to take into account the manufacturing tolerances in the distance between the axes of the bores 16 and 34, and to center the planar surface 38 of the spindle axially on the planar part 40 of the caliper while the brake is being assembled, without introducing any parasitic stresses thereto. Such stresses may, however, be generated if the foot of the spindle moves while the screw 44 is being tightened, in particular owing to the high value of the tightening torque, which is typically of the order of 10 mdaN.

In accordance with the invention, a member is provided for holding the spindle during the operation of assembling the brake. According to a first embodiment, this member consists of a spring clip, denoted overall by the reference 50, and represented in perspective in FIG. 6.

The clip 50 is intended to be slipped over the arm 48 of the caliper 10, and mainly includes four faces, elastically clamping the arm 48, in pairs. The face 52 located on the outer side of the arm 48 is provided with an opening 54 of dimensions greater than that of the head of the screw 44. The opposite face 56, located on the inner side of the arm 48, is also provided with an opening 58, opening out on the side of the face 56 opposite a side 60 of the clip 50 intended to come to rest on the radially outer face of the arm 48 of the caliper 10, the face 60 being held in contact with the arm 48 by a fourth face 62, resting on the radially inner face of the arm 48 of the caliper 10, the face 62 being formed, in the example represented, by two parallel arms in axial direction.

Figure 4:
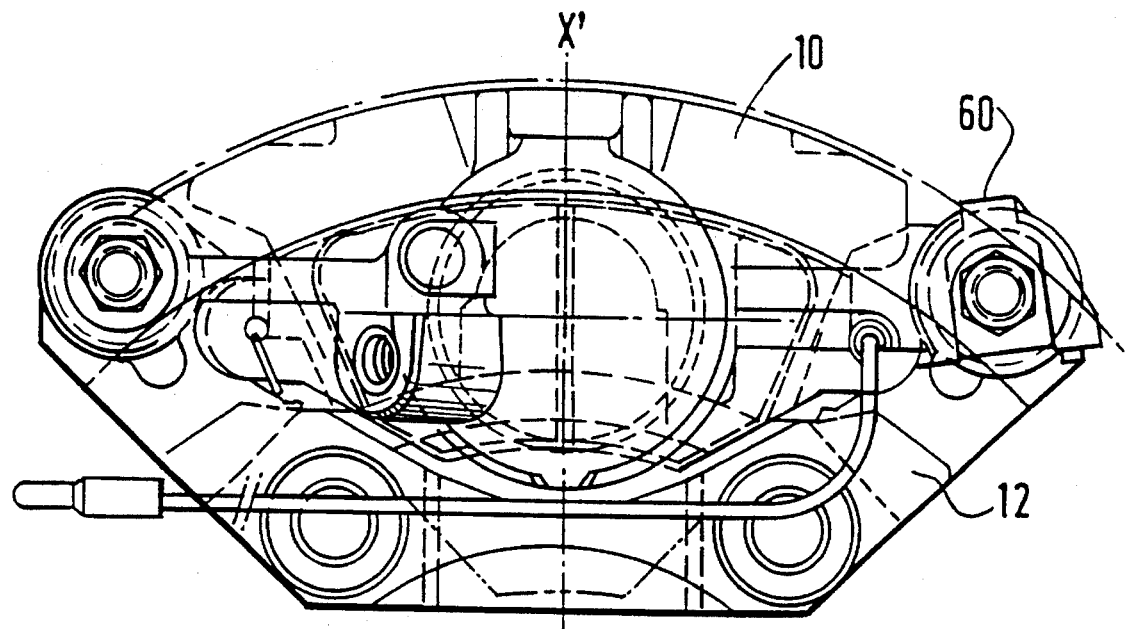
FIG. 4 is a front view of the disk-brake of FIG. 1, after its assembly.
Figure 5:
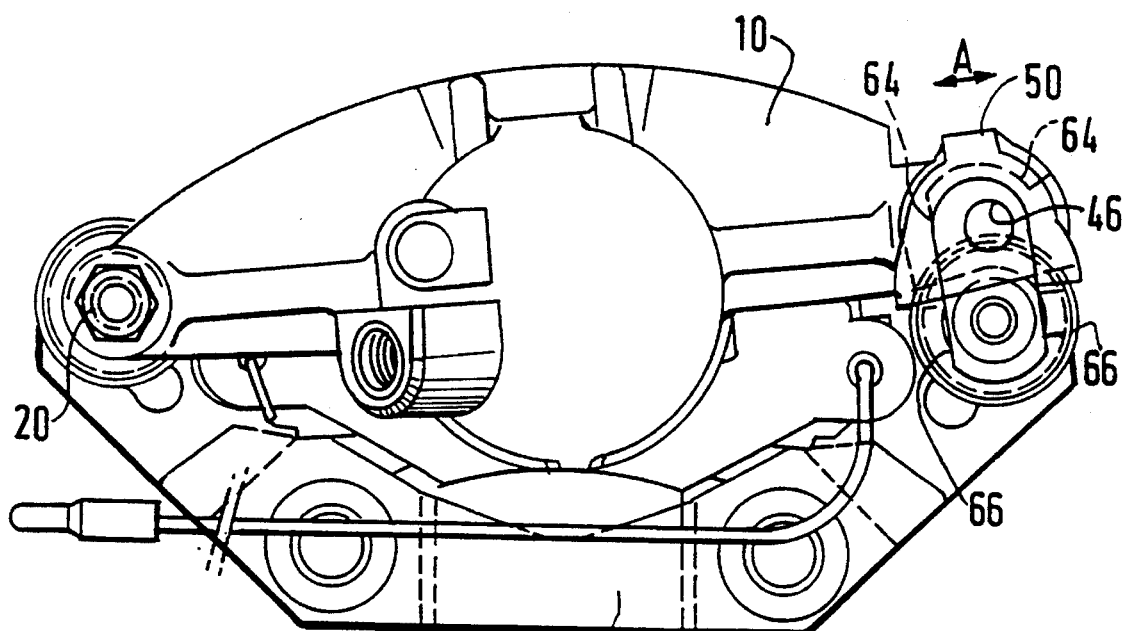
FIG. 5 is a front view of the disk-brake of FIG. 1 before its assembly.

The opening 58 in the face 56 has two parallel sides 64 of direction substantially parallel to the axis of symmetry X—X' of the disk-brake when the clip 50 is in place on the disk-brake in the operating position (FIG. 4).

The foot 36 of the spindle itself includes two parallel flats 66 (FIG. 5) of the same direction as sides 64 under the same conditions. The thickness of the foot 36 of the spindle between the flats 66 is slightly less than the distance between the sides 64 of the opening 58.

From the foregoing explanations, it will have been understood how the invention is implemented. When the brake is being mounted, after the guide pin 14 has been introduced into bore 16 [sic], the clip 50 is slipped over the arm 48 of the caliper 10 and the rod 32 of the axial spindle is introduced into the bore 34, as has been described previously.

The caliper 10 is then tilted toward the stationary support 12 to align the opening 46 with the bore 42 of the foot 36 of the spindle. During this operation, the sides 64 of the opening 58 of the clip 50 slide over the flats 66 of the foot 36 of the axial spindle (FIG. 5) so as to place the clip 50 over the arm 48 in the direction of the double-headed arrow A on the basis of the position of the foot 36 of the spindle determined by the guidance of the sliding part 33 in the bore 34.

When the screw 44 is introduced into the opening 46 of the caliper and the bore 42 of the foot 36, the latter is thus in contact via its surface 38 on the surface 40 of the caliper, in a position corresponding to the exact centering of the spindle in the bore 34. The clip 50 then holds the foot 36 in this position while the screw 44 is being tightened, both in terms of rotation, by virtue of the interaction between the flats 66 and the sides 64 of the clip, and in terms of translation, the clip having adopted a tangential position, according to the double-headed arrow A of FIG. 5, while the caliper is being tilted toward the stationary support, corresponding to the exact centering of the spindle in the bore 34.

It is therefore sufficient to tighten the screw 44 into the foot 36 of the spindle through the arm 48 of the caliper, the foot 36 remaining held in place on the arm 48 by virtue of the clip 50. When the screw 44 has been fully tightened, the axial spindle will be perfectly aligned in the bore 34, and will therefore be able to allow optimal sliding of the caliper 10 on the stationary support 12, regardless of the manufacturing tolerances in the distance between the axes of the bores 16 and 34.

Figure 7:
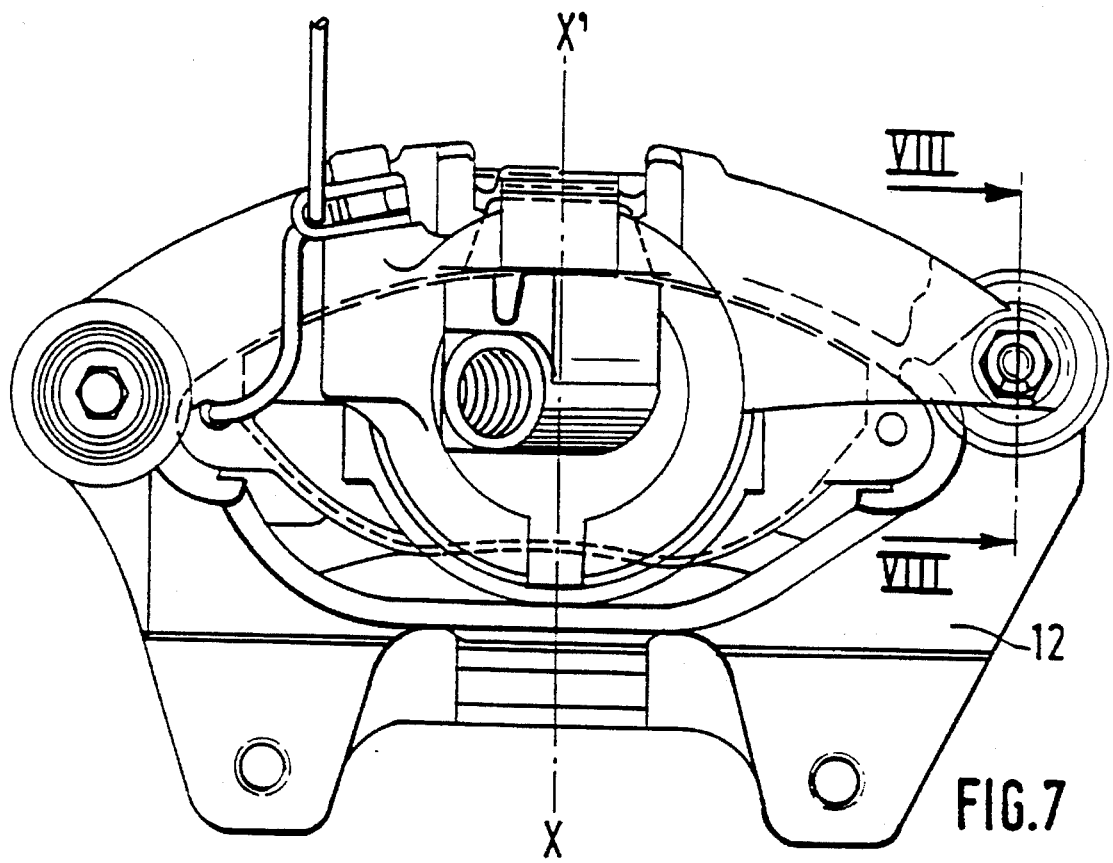
FIG. 7 is a front view of the disk-brake produced in accordance with a first variant embodiment of the present invention.
Figure 8:
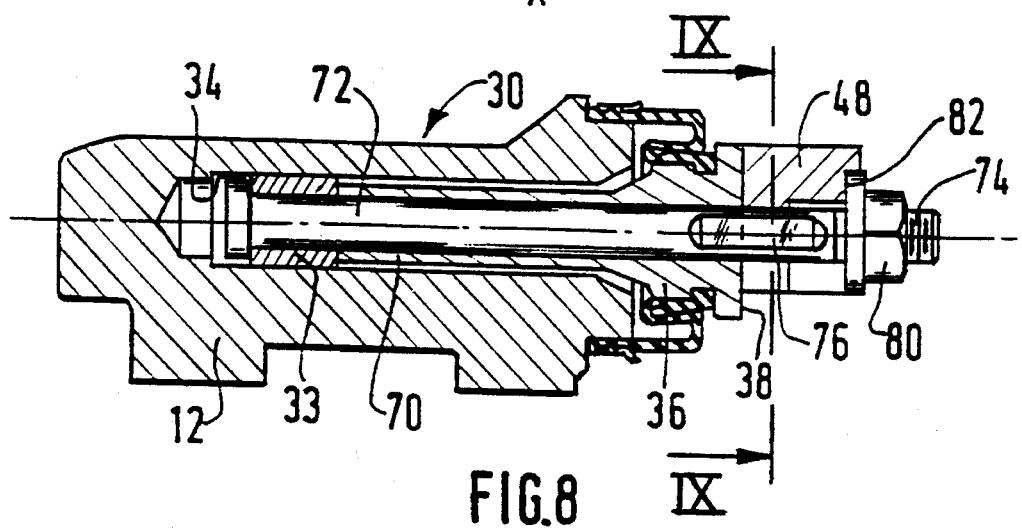
FIG. 8 is a sectional view along the line VIII—VIII of FIG. 7.
Figure 9:
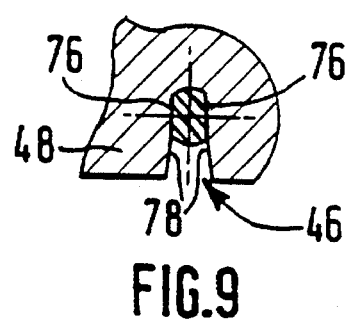
FIG. 9 is a sectional view along the line IX—IX of FIG. 8.

FIGS. 7 to 9 represent a variant in the embodiment which has just been described. In these figures, the identical or similar elements are identified by the same reference numbers.

According to this variant, the axial spindle is produced in two parts, an external part 70 including the foot 36, and forming a spacer for an inner part 72 including, at one end, the part 33 sliding in the bore 34 and, at the other end, a threaded part 74, in the Vicinity of two flats 76.

The opening 46 in the arm 48 of the caliper 10 is formed so that it emerges radially toward the stationary support 12, and is of oblong overall shape, of principal axis parallel to the axis XX' when the disk-brake is in the operating position. The opening 46 thus includes two substantially parallel sides 78 spaced apart by a distance which is slightly greater than the thickness of the part 72 between the flats 76.

This embodiment variant is implemented like the previous one: after the guide pin 14 has been introduced into the bore 16, the outer part 70 of the spindle is slipped over the inner part 72 until it comes into abutment on the sliding part 33, the threaded part 74 and the flats 76 extending beyond the surface 38. The assembly is then introduced into the bore 34.

The caliper 10 is then tilted toward the stationary support 12, the sides 78 of the opening 46 in the arm 48 sliding over the flats 76. A nut with a collar 80 may then be screwed onto the thread 74 to lock the caliper 10 on the stationary support 12. The counterbore 82 produced on the outer face of the arm 48, at a diameter slightly greater than that of the collar of the nut 80, can be used to check that the caliper has been placed correctly.

According to this variant also, when the nut 80 has been fully tightened, the axial spindle is perfectly aligned in the bore 34 via its sliding part 33. The outer part 70 of the axial spindle forming a spacer between said axial spindle and the arm 48 of the caliper to position the foot 36 of the spindle, and the inner part 72 acting as a tie to secure the spindle to the caliper.

Various modifications could be made to this variant with respect to the embodiment which has been represented: the sliding part 33 could consist of a ring held axially by tightening between the tie 72 and the spacer 70, and it could also be formed integrally with the spacer 70 or the tie 72, or be attached, for example forcibly mounted, on one of these two elements.

Figure 10:
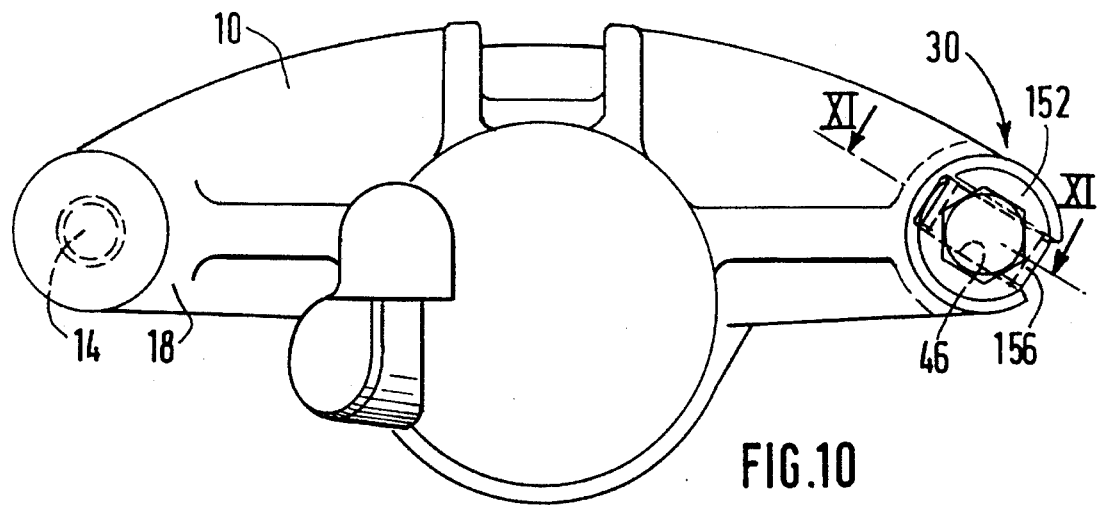
FIG. 10 is a front view analogous to that of FIG. 7 of a second variant embodiment of the present invention.
Figure 11:
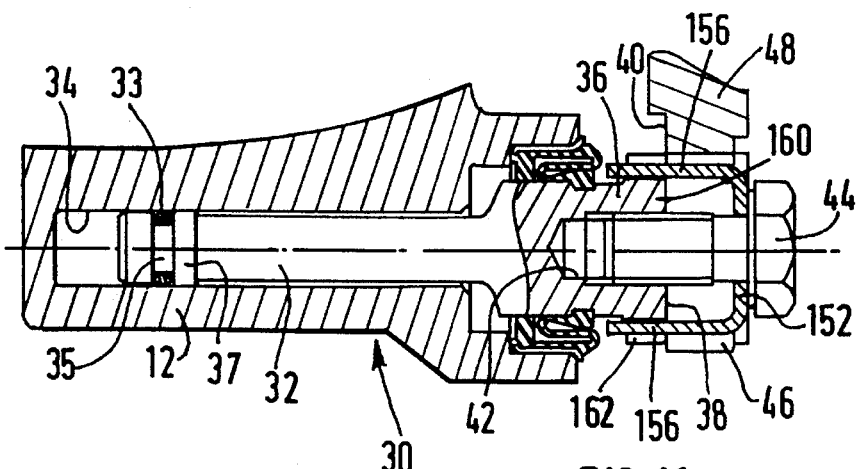
FIG. 11 is a sectional view along the line XI—XI of FIG. 10.
Figure 12:
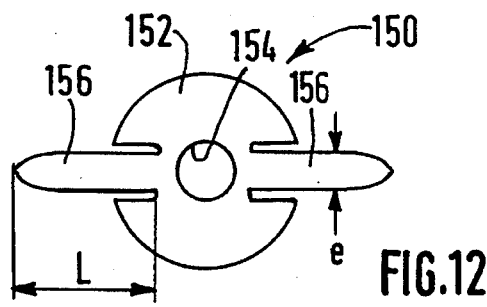
FIG. 12 is a plan view of the holding member used in the brake represented in FIGS. 10 and 11.

FIGS. 10 to 12 represent a second variant embodiment of the invention. In these figures, the identical or analogous elements are identified by the same reference numerals.

The locking means 30 includes, as in the first embodiment, an axial spindle formed of a rod 32 received with sliding by a sliding part 33 in a bore 34 formed in the stationary support 12, and a foot 36. The foot includes a planar surface 38 perpendicular to the axis of the spindle and forming, when the disk brake is assembled, a stop bearing on a planar part 40 of the caliper 10.

The sliding part 33 could be made up, in this variant as in the embodiments described above, of an O-ring 33 inserted in a groove 35 formed in an end part 37 of the rod 32 of diameter slightly greater than that of the rod 32 itself.

The foot 36 is formed with a tapped bore 42 emerging at the surface 38, intended to receive an immobilizing member 44, such as a screw, passing with clearance through a fitting opening 46 made in an arm 48 of the caliper 10.

According to this variant embodiment, the member 150 for holding the spindle during the operation of assembling the brake is made up of a component, the shape of which, developed in plan view, is represented in FIG. 12. The member 150 includes a central part 152 provided with an opening 154 and two symmetrical tabs 156.

The tabs 156 are intended to be folded over perpendicularly to the central part 152 so as to extend mutually parallel. They have a width 1 slightly less than the width of the fitting opening 46 in the arm 48, and a length L greater than the thickness of the arm 48 increased by the thickness of a collar 160 formed on the foot 36 of the spindle 30 adjacent to the planar surface 38.

The collar 160 itself is formed with two axial grooves 162 having a width, in the circumferential direction about the axis of the spindle 30, slightly greater than the width 1 of the tabs 156.

The fitting of the brake takes place in the same fashion as in the preceding embodiments: the caliper 10 equipped with the guide pin 14 is put in place on the stationary support 12 by introducing this guide pin into the bore 16. The caliper 10 is tilted (upward considering FIG. 10) so as to uncover the entrance of the bore 34; it is then possible to introduce the part 33 of the rod 32 of the axial spindle into the bore 34. The axial spindle is then in the centered position in the bore 34, given the small amount of clearance existing between the latter and the sliding part 33 of the rod 32. The caliper is then tilted in the other direction (downward considering FIG. 10) in order to align the opening 46 with the bore 42 of the foot 36 of the spindle.

The tabs of the holding member 150 are then introduced into the opening 46, so that they become housed in the axial grooves 162 formed on the foot 36 of the spindle, to which the suitable angular orientation about its axis will have been given beforehand. The angular orientation of the spindle may adjust by itself when the holding member 150 is installed if the end of the tabs 156 is formed into a point, possibly rounded as represented in FIG. 12.

The screw 44 may then be introduced into the openings 154 in the holding member 150, and 46 of the caliper in order to secure the axial spindle to the caliper, and thus lock the latter in terms of rotation about the guide pin 14.

When the screw 44 is tightened into the foot 36 of the spindle through the arm 48 of the caliper, the surface 38 of the foot 36 remains held in contact with the surface 40 of the caliper in a position corresponding to the exact centering of the spindle in the bore 34. Immobilization of the spindle in terms of rotation is obtained by virtue of the interaction between the tabs 156 and the axial grooves 162, giving rise to a torque resisting the rotation of the spindle, without giving rise to any loading, or radial displacement.

At the end of tightening of the screw 44, the axial spindle will thus be perfectly aligned in the bore 34, and will thus allow optimal sliding of the caliper 10 on the stationary support 12, regardless of the manufacturing tolerances in the distance between the axes of the bores 16 and 34.

As a variant to this embodiment, provision may be made for rendering the screw 44 captive by the holding member 150, in the fashion of captive screws of some fittings, so as to prevent this member 150 being forgotten during operations of assembly or maintenance of the disk-brake thus equipped.

Other modifications may also be made to the two variants described. For example, the axial guide pin 14 and/or the locking spindle could be fixed to the stationary support 12 and slide in a bore made in the caliper. Likewise, the locking spindle could be produced in the form of a guide pin and be provided with a holding member in accordance with the present invention.

We claim:

1. A disk-brake having a caliper which slides on a stationary support formed by means of at least one axial guide pin slidingly received in a first bore located in said stationary support, said caliper including actuating means capable of stressing at least one friction pad which is anchored on and slidable with respect to said stationary support toward a rotating disk, locking means for preventing rotation of said caliper about said axial guide pin attached to said stationary support, said locking means consisting of an axial spindle including a shank having a first part of which slides in a second bore formed in said stationary support and a foot, said foot forming a planar stop surface perpendicular to a central axis of said axial spindle, said foot engaging a planar part of the caliper, said foot of the axial spindle interacting with a blocking member by passing with clearance through a mounting opening made in said caliper to allow axial centering of said axial spindle during assembly of said disc brake, characterized in that a holding member is located adjacent said mounting opening to immobilize and prevent rotation of said axial spindle while said disc brake is being assembled, said holding member having a central part with an opening which receives said blocking member, said holding member having tabs which pass through said mounting opening, said tabs of said holding member interact with axial grooves formed on said foot of said axial spindle, said axial spindle being immobilized with respect to radial translation by said second bore, and said first part of said axial spindle sliding with reduced clearance in said second bore and said guide pin sliding with the same clearance in the first bore.

2. The disk-brake according to claim 1, characterized in that said tabs of said holding member have a width which is slightly less than a width of said mounting opening and said axial grooves of said foot of said axial spindle.

3. The disk-brake according to claim 2, characterized in that said tabs of the holding member have a length which is greater than a thickness of an arm of said caliper and a thickness of a collar formed on said foot of said axial spindle.

4. The disk-brake according to claim 3, characterized in that said tabs of said holding member have an end of the is formed into a point.

5. The disk-brake according to claims 4, characterized in that said blocking member is held captive by said holding member.

6. The disk-brake according to claim 1, characterized in that said holding member consists of a spring clip gripping a part of said caliper adjacent said mounting opening.

7. The disk-brake according to claim 6, characterized in that said spring clip includes an opening interacting with said foot of said axial spindle to immobilize said axial spindle during the assembly of said disc brake.

8. The disk-brake according to claim 7, characterized in that said opening is formed with two parallel sides interacting with two parallel flats formed on said foot of said axial spindle.

9. The disk-brake according to claim 1, characterized in that said axial spindle is formed of an outer part forming a spacer and of an inner part forming a tie, said holding member being formed by a part of said tie by interacting with a part of said caliper forming said mounting opening.

10. The disk-brake according to claim 9, characterized in that said shank of said axial spindle has two parallel fiats which interact with two corresponding parallel sides located in caliper that forms said mounting opening.

* * * * *